J. D. HOPE.
Steam-Plow.
No. 7,415.
Patented June 4, 1850.
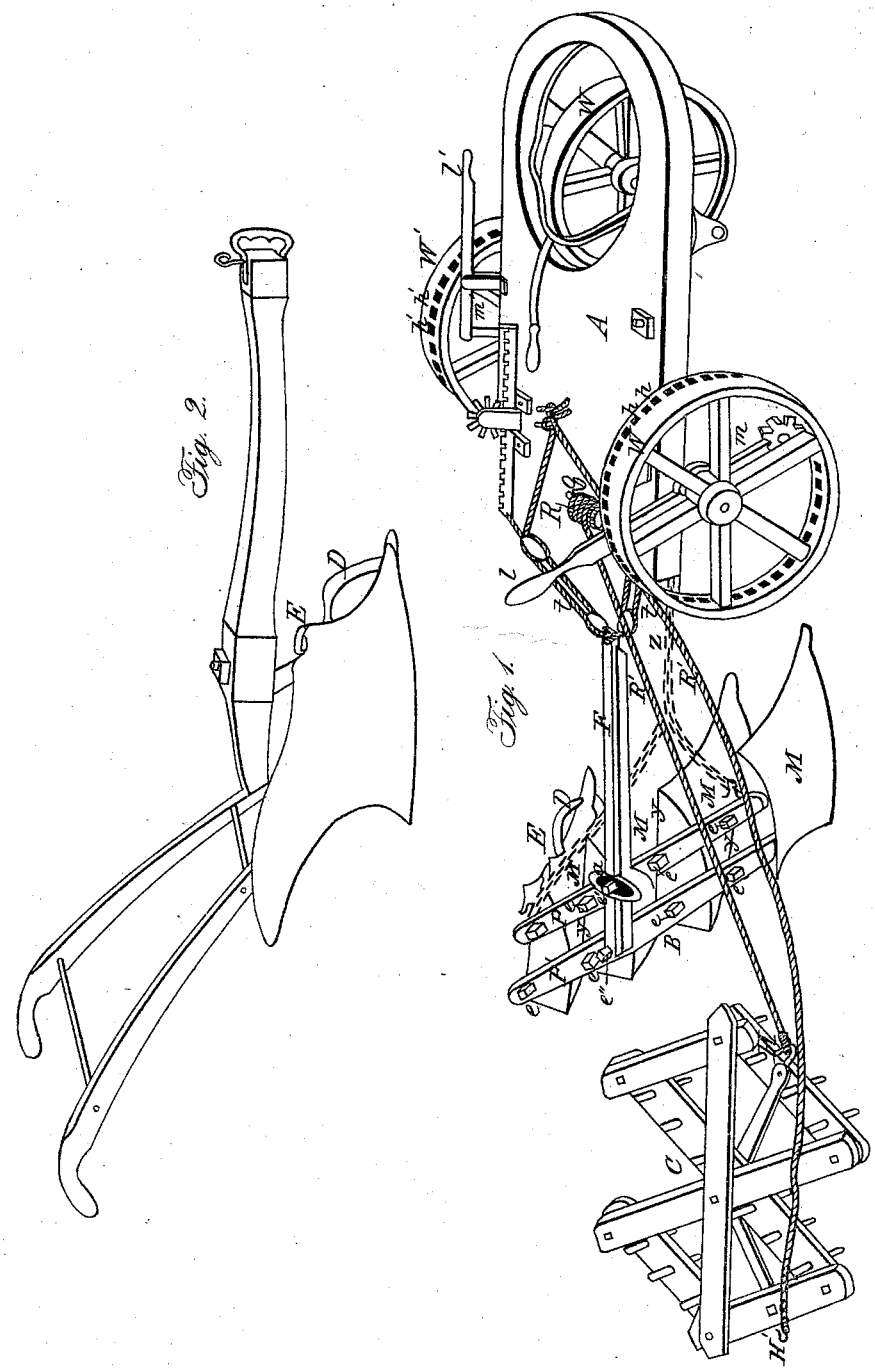

UNITED STATES PATENT OFFICE.

JOSEPH D. HOPE, OF PHILADELPHIA, PENNSYLVANIA.

IMPROVEMENT IN GANG-PLOWS.

Specification forming part of Letters Patent No. 7,415, dated June 4, 1850.

*To all whom it may concern:*

Be it known that I, JOSEPH D. HOPE, of the city and county of Philadelphia, and State of Pennsylvania, have invented a new and useful Machine for Tilling Land by Steam; and I do hereby declare that the following is a full, clear, and exact description thereof, reference being had to the accompanying drawing, which make part of this specification.

My purpose in this invention has been to remedy some of those evils which have thus far prevented the successful application of steam-power to the cultivation of land.

One of the chief difficulties in the way of using locomotive-engines for plowing, harrowing, &c., has been the want of suitable means of gaining adhesion to the ground, so as to prevent the driving-wheels from turning without advancing. Another difficulty has been the want of means of arranging a gang of plows in such manner as to be capable of adjustment for narrow or wide furrows, according as the engine is by its adhesion found capable of plowing to a greater or less depth, or of making a series of furrows of greater or less breadth, and also of inclining to their work according to the circumstances under which they are used. Another difficulty has been the clogging of the plows and the want of adequate means of clearing away the weeds, grass, stalks, stubble, &c. This evil, which is more or less felt in all plows of the ordinary construction, becomes greater where the plowman cannot be at hand to clear away the impediments to the sinking of the plow into the ground. The last obstacle to the cultivation of land by steam is the want of suitable means for clearing the harrow which follows the plow.

The manner in which I remedy these several obstacles to the tillage of land by steam-power is as follows: I make the tire of the driving-wheels of my plow locomotive-engine wide enough to receive a series of poles, $p\,p$, Figure 1, through which may project downward the pointed teeth of a spur-wheel, $s$, to grapple the ground on which the wheel is at the moment resting. Though I prefer holes through the tire, the notches between cogs formed on the side of the tire may in some cases be substituted without altering the principle or mode of action of my wheel.

In the description above given, reference is made to Fig. 1, wherein A represents a platform of the locomotive-engine; but as the boiler and machinery of such an engine constitute no part of my invention, I have not represented them, as this is not necessary to make known what I have invented. The spur-wheel is not proposed to be kept constantly in a position to penetrate or grapple the ground; but its position may be so varied as to allow the wheel to travel without its acting. This may be done in more than one way. There may be a lever, $l$, supported on the axis of the driving-wheel W as a fulcrum, and carrying the spur-wheel $s$ near the extremity of its lower arm, $m$. When $l$ stands in a vertical position the wheel $s$ will be at the bottom of the traveling wheel W, and then the teeth or rowels of the spur-wheels will pass through the tire into the ground, and when thrown (as seen in the figure) into a position inclined to the horizon the teeth, though passing through the tire, will not come in contact with the ground.

Another mode of bringing the spur-wheel into and out of action is indicated at $l'$, which is a lever that raises vertically the supporting-bar $m'$, on the lower end of which the spur-wheel may be suspended. (Not seen in the drawing.) By depressing $l'$ the spur-wheel is lifted out of contact with the rim of the wheel W', and by elevating $l'$ it is made to throw its teeth through the openings $h'\,h'$, &c., and is brought into action at the pleasure of the engineer.

The plows M M M M are made to plow furrows of greater or less breadth by having arranged on two parallel bars, P P', to which they are respectively confined, each by two screw-bolts, $e\,e$. When the bars P P' are set perpendicularly across the straight sides $y\,y\,y\,y$ of the plows the breadth of the furrows will be the greatest, and when the bars stand obliquely to the straight sides of the plows the furrows will be narrower, according to the degree of obliquity.

The gang of plows is drawn, or at least guided, by the plow-beam F, which at its posterior extremity is attached by a bolt, $e''$, to the parallel bar P', and has a curved slot, $a$, over the bar P, through which passes an adjusting screw-bolt, $e'$. By relaxing this screw the plow-beam F may be brought into any required obliquity to the two parallel bars P and P', so as to direct the draft of the plows more or less to the land, whatever may be the breadth of furrow which the plows are set to produce. The parallel bars D D' are necessarily combined with the means of making the line of draft conform to the breadth of furrows.

The beam F may be attached to the engine by suitable tackles, t t, or equivalent attachments, so arranged as to cause the plows to follow the locomotive centrally or toward either side, as may be found most expedient. The draft may be made to depend mainly on a chain, z, while the steering only is regulated by the beam F.

To prevent the clogging of the plows I cause the cutter or colter, instead of going up to the beam, to rise only about two-thirds as high as the mold-board, as seen at D, and then to turn backward and join the front edge of the mold-board and continue it with a deflector. For this purpose I form an extension E of the mold-board plate, curve it to the right or over the mold-board, or to the left over the preceding furrows, and with this give a lateral motion to any materials which might tend to accumulate and clog the plow. The short-turned back colter allows the stubble to come in a continuous stream to the deflector instead of being accumulated before the upper part of the colter beneath the beam.

The manner in which I clear the harrow when dragged by the locomotive cultivating-machine is represented at R, Fig. 1, which is a rope winding on a roller with a crank, o, by turning which either end R' R'' of the rope may be made to draw the harrow.

The harrow I generally make six-sided, and attach to it two hooks, H and H', to receive the two ends of the rope, R' and R''. If while drawn by the end R' the harrow is perceived to be clogged, the driver or attendant of the engine turns the crank in the direction to slacken R' and to tighten R'', whereby the direction of the harrow's motion is reversed.

What I claim as new, and desire to secure by Letters Patent, is—

1. The spur-wheel s, so constructed and arranged within the pheriphery of the driving-wheel that it may be made at pleasure to pass its rowels through the holes or notches in the tire into the surface of the ground when under compression, and thereby grapple and gain adhesion to the ground, substantially in the manner herein set forth.

2. The combination of parallel bars P P' to regulate the breadth of each separate furrow with the adjusting-curve a' for determining the horizontal direction of the draft, so as to adapt the amount of work done by a single traverse of the engine to the adhesive power of the wheels when applied to the particular kind of land under cultivation, substantially as herein set forth.

3. Preventing the choking of the plow by means of the recurved point E of the mold-board acting to turn aside and guide backward the choking material, as herein set forth.

4. The manner of connecting the harrow to the locomotive so that the conductor may at pleasure, by turning a crank, reverse it advancing side for the purpose of freeing the harrow-teeth from choking materials, in the manner substantially as herein set forth.

J. D. HOPE.

Witnesses:
R. K. SCOTT,
JNO. COOK.